Aug. 17, 1937.
K. HAYES
2,090,121
AUTOMOBILE WIND PENNANT
Filed June 11, 1935
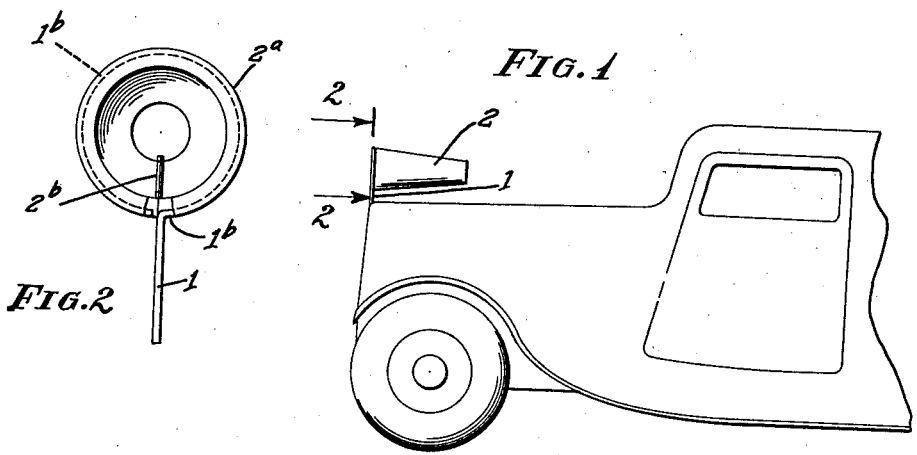
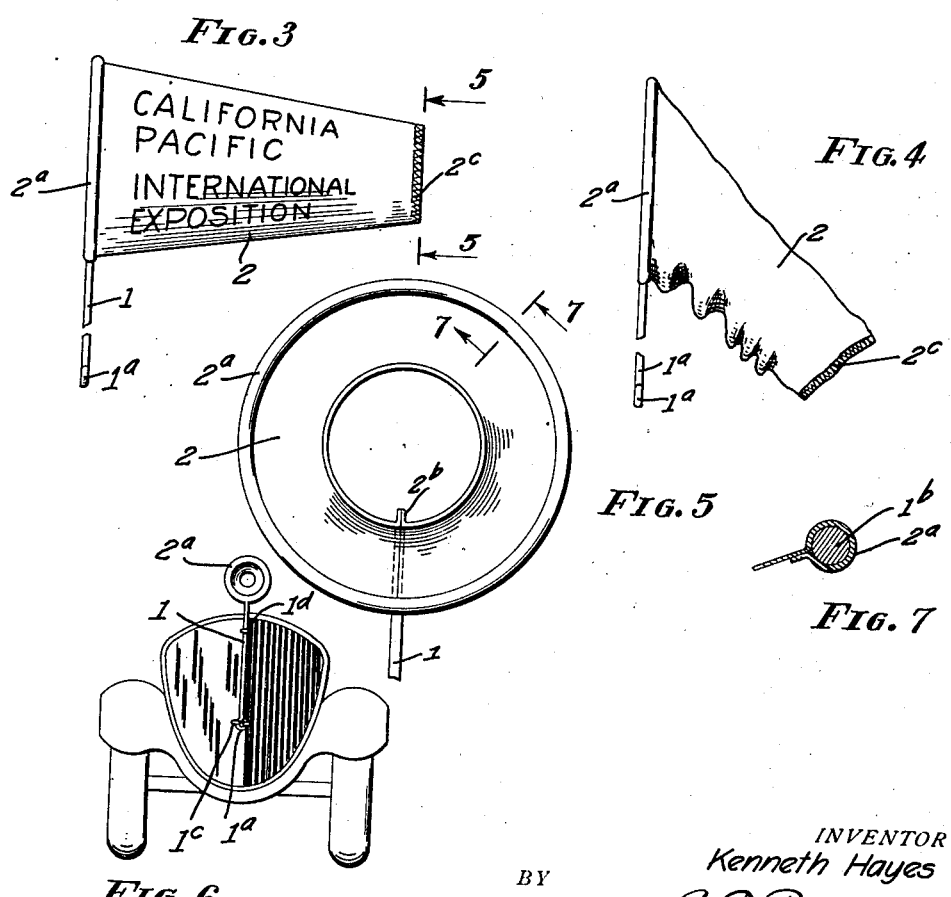
INVENTOR
Kenneth Hayes
A.B.Bowman
ATTORNEY Patented Aug. 17, 1937

2,090,121

UNITED STATES PATENT OFFICE 2,090,121

AUTOMOBILE WIND PENNANT

Kenneth Hayes, San Diego, Calif.

Application June 11, 1935, Serial No. 26,002

2 Claims. (Cl. 116—173)

My invention relates to a pennant which is held in its proper position by air passing through the same when positioned on an automobile and the automobile is moving, and the objects of my invention are:

First, to provide a pennant which is supported in substantially horizontal position by air passing through the pennant while the automobile is moving;

Second, to provide a pennant of this class which is adapted to be attached to the front portion of an automobile; particularly the radiator guard;

Third, to provide a pennant of this class which is so constructed, shaped and arranged that upon the movement of the automobile the pennant will assume a substantially horizontal position throughout its whole area;

Fourth, to provide a pennant of this class which is tapered gradually from its support backwardly in frusto-conical shape when in expanded position by reason of air passing therethrough; and Fifth, to provide a pennant of this class which is very simple and economical of construction, easily applied to an automobile, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a side elevational view of the front portion of an automobile showing my pennant in operative position thereon shown in the position indicated when the automobile is running or passing through the air; Fig. 2 is a front elevational view of the device from the line 2—2 of Fig. 1 shown on an enlarged scale; Fig. 3 is a side elevational view showing the support fragmentarily; and showing the pennant in expanded position; Fig. 4 is a similar view to that of Fig. 3 showing the pennant drooped in the position when the automobile is not running and the air passing therethrough; Fig. 5 is an end view from the line 5—5 of Fig. 3; Fig. 6 is a front elevational view of the front end of an automobile showing my pennant positioned thereon, as indicated when the automobile is running; and Fig. 7 is an enlarged sectional view along the line 7—7 of Fig. 5.

Similar characters of reference refer to similar parts and portions throughout the several views of the drawing.

The pennant consists of a main supporting member 1 which is preferably made of wire approximately ⅛" in diameter. It is provided with a loop 1a at its lower end, shown best in Fig. 6 of the drawing, and with a large loop 1b at its normally upper end, shown best in Fig. 2 of the drawing, and is made of one single piece of wire. Mounted in the loop 1a is a wire tie member 1c which extends through the loop 1a and passes around one of the bars of the radiator guard so as to support the member 1 rigidly in relation to the radiator guard. Between this member 1c and the upper side of the radiator guard is another wire tie member 1d which is supported around one of the bars of the radiator guard near the top of said guard for rigidly securing the support 1 against side movement. The loop 1b on the upper end of the member 1 forms a support for the pennant 2, which pennant is formed of fabric or similar material and is provided with a hem in its large end through which the loop 1b of the member 1 passes, as shown in the drawing.

The pennant 2 is preferably provided with a seam 2b, shown best in Fig. 5 of the drawing, which extends along the lower side of the pennant member and forms a reinforcing for this lower side. The pennant member tapers so that its form is frusto-conical, as shown best in Figs. 1 and 3 of the drawing, when in operation on a moving automobile. It is provided at its rear side with a reinforced stitching 2c to provide a reinforcing for the smaller end and also prevents the end from fraying. On the opposite sides of the pennant may be placed any printed or illustrative matter desired.

The operation of my pennant is as follows: The support 1 is secured on the front end of the automobile by means of the supports 1c and 1d so that the pennant is positioned slightly above the front end portion with the larger end in front. It will be noted that the loop 1a is positioned with its flat side against the front portion of the automobile so that it holds the pennant support 1 from turning. Then when the automobile moves the air passes through the pennant and gradually compresses thus holding the pennant in a straight back position, as shown best in Figs. 1 and 3 of the drawing.

Having thus described my invention, what I claim as new and desire to secure by Letters Patent is:

1. An automobile wind pennant consisting of, an upright wire support provided with a relatively small loop on its normally lower end and a relatively large loop on its upper end, a hollow frusto-conical pennant with its large end secured around the loop member at the upper end, means for supporting said wire member rigidly in connection with an automobile radiator guard, and reinforcing means at the small end of said pennant.

2. An automobile wind pennant consisting of, an upright wire support provided with a relatively small loop on its normally lower end and a relatively large loop on its upper end, a hollow frusto-conical pennant with its large end secured around the loop member at the upper end, means for supporting said wire member rigidly in connection with an automobile radiator guard, reinforcing means at the small end of said pennant, and reinforcing means along the lower inner side between the loop member and the reinforcing means at the small end of said pennant and extending from said loop to said reinforcing means.

KENNETH HAYES.